United States Patent
Upadhyay et al.

(10) Patent No.: US 11,593,215 B2
(45) Date of Patent: Feb. 28, 2023

(54) METHOD AND SYSTEM FOR GENERATING IMMUTABLE BACKUPS WITH CONFIGURABLE RETENTION SPANS

(71) Applicant: EMC IP Holding Company LLC, Hopkinton, MA (US)

(72) Inventors: Navneet Upadhyay, Ghaziabad (IN); Rejith Mohan M, Bengaluru (IN); Shraddha Chunekar, Indore (IN); Amith Ramachandran, Bangalore (IN); Shelesh Chopra, Bangalore (IN); Reshmee Jawed, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 114 days.

(21) Appl. No.: 16/782,103

(22) Filed: Feb. 5, 2020

(65) Prior Publication Data
US 2021/0240570 A1 Aug. 5, 2021

(51) Int. Cl.
*G06F 16/11* (2019.01)
*G06F 16/176* (2019.01)
*G06F 11/14* (2006.01)
*G06F 16/18* (2019.01)

(52) U.S. Cl.
CPC ...... *G06F 11/1451* (2013.01); *G06F 11/1471* (2013.01); *G06F 16/128* (2019.01); *G06F 16/1774* (2019.01); *G06F 16/1865* (2019.01); *G06F 2201/80* (2013.01)

(58) Field of Classification Search
CPC ............. G06F 11/1451; G06F 16/1865; G06F 16/128; G06F 16/1774; G06F 11/1471
USPC ........................................................ 707/645
See application file for complete search history.

(56) References Cited

U.S. PATENT DOCUMENTS

| | | | | |
|---|---|---|---|---|
| 5,813,009 A * | 9/1998 | Johnson | ................... | G06F 16/40 707/695 |
| 7,155,463 B1 * | 12/2006 | Wang | ..................... | G06F 16/27 707/999.102 |
| 7,293,027 B2 * | 11/2007 | Margolus | ............ | G06F 16/2358 |
| 7,634,511 B1 * | 12/2009 | Freiheit | ............... | G06F 11/1458 707/999.102 |
| 8,028,135 B1 * | 9/2011 | Manley | ............... | G06F 11/1448 711/161 |
| 8,117,165 B1 * | 2/2012 | Winckelmann | ..... | G06F 16/2379 707/661 |
| 8,433,864 B1 * | 4/2013 | Narayanan | .......... | G06F 11/1448 711/162 |
| 8,442,957 B2 * | 5/2013 | Saake | ................... | G06F 16/113 707/694 |
| 8,504,787 B1 * | 8/2013 | Graves | ................ | G06F 11/3442 711/171 |

(Continued)

FOREIGN PATENT DOCUMENTS

| | | | | |
|---|---|---|---|---|
| CN | 110704242 A * | 1/2020 | | |
| DE | 10053016 A1 * | 4/2002 | .......... | G06F 11/1461 |

*Primary Examiner* — Phuong Thao Cao
(74) *Attorney, Agent, or Firm* — Chamberlain, Hrdlicka, White, Williams & Aughtry

(57) ABSTRACT

In general, the invention relates to a method for performing backup operations. The method includes generating a backup on backup storage system, locking the backup for a retention span, generating a backup archive log image using archive log files for the backup, and locking the backup archive log image for a second retention span.

14 Claims, 9 Drawing Sheets

(56) References Cited

U.S. PATENT DOCUMENTS

| | | | | |
|---|---|---|---|---|
| 8,712,970 B1* | 4/2014 | Sim-Tang | G06F 16/20 | 707/672 |
| 8,732,417 B1* | 5/2014 | Stringham | G06F 11/1448 | 711/162 |
| 10,592,353 B2* | 3/2020 | Martin | G06F 11/1451 | |
| 10,620,834 B2* | 4/2020 | Wadhwa | G06F 3/067 | |
| 10,628,270 B1* | 4/2020 | Bajaj | G06F 11/1471 | |
| 10,650,146 B1* | 5/2020 | Gaurav | G06F 21/562 | |
| 10,656,863 B1* | 5/2020 | Vines | G06F 3/0611 | |
| 11,422,898 B2* | 8/2022 | Dillon | G06F 11/1453 | |
| 2005/0097260 A1* | 5/2005 | McGovern | G06F 3/067 | 711/100 |
| 2009/0249005 A1* | 10/2009 | Bender | G06F 11/1469 | 711/162 |
| 2011/0066799 A1* | 3/2011 | Gold | G06F 11/1453 | 711/111 |
| 2011/0125714 A1* | 5/2011 | Manson | G06F 11/1458 | 707/645 |
| 2011/0131185 A1* | 6/2011 | Kirshenbaum | G06F 11/1448 | 711/E12.001 |
| 2011/0161295 A1* | 6/2011 | Ngo | G06F 11/1446 | 707/639 |
| 2012/0036106 A1* | 2/2012 | Desai | G06F 11/2097 | 707/645 |
| 2013/0166521 A1* | 6/2013 | Ghatty | G06F 11/1469 | 707/695 |
| 2013/0326279 A1* | 12/2013 | Chavda | G06F 11/3672 | 714/E11.178 |
| 2014/0047203 A1* | 2/2014 | McPhail | G06F 3/0604 | 711/162 |
| 2015/0199367 A1* | 7/2015 | Hammer | G06F 16/1748 | 707/654 |
| 2015/0227434 A1* | 8/2015 | Goebel | G06F 11/1448 | 707/645 |
| 2016/0110265 A1* | 4/2016 | Athani | G06F 16/22 | 707/654 |
| 2017/0116220 A1* | 4/2017 | Wong | G06F 11/1471 | |
| 2017/0277435 A1* | 9/2017 | Wadhwa | G06F 3/0649 | |
| 2017/0315877 A1* | 11/2017 | Kaplingat | G06F 16/1865 | |
| 2018/0121453 A1* | 5/2018 | Jain | G06F 11/1448 | |
| 2018/0336210 A1* | 11/2018 | Bourgeois | G06F 11/1451 | |
| 2020/0097195 A1* | 3/2020 | Fritz | G06F 3/0647 | |
| 2020/0159628 A1* | 5/2020 | Martin | G06F 11/1474 | |
| 2020/0201944 A1* | 6/2020 | Mahadik | G06F 16/13 | |
| 2020/0341659 A1* | 10/2020 | Chauhan | G06F 3/067 | |
| 2021/0026671 A1* | 1/2021 | Hadas | G06F 9/45558 | |
| 2021/0224379 A1* | 7/2021 | Pientka | G06F 21/568 | |

* cited by examiner

METHOD AND SYSTEM FOR GENERATING IMMUTABLE BACKUPS WITH CONFIGURABLE RETENTION SPANS

BACKGROUND

Database protection defines the process of protecting database data using a secondary storage. More specifically, protection of the database data often entails replicating database data, sending the replicated data to a secondary storage across a network, and storing the replicated data on the secondary storage.

SUMMARY

In general, in one aspect, the invention relates to a method for performing backup operations. The method includes generating a backup on backup storage system, locking the backup for a retention span, generating a backup archive log image using archive log files for the backup, and locking the backup archive log image for a second retention span.

In general, in one aspect, the invention relates to a system that includes a processor and a client protection agent, which when executed by the processor performs a method. The method includes generating a backup on backup storage system, locking the backup for a retention span, generating a backup archive log image using archive log files for the backup, and locking the backup archive log image for a second retention span.

In general, in one aspect, the invention relates to a non-transitory computer readable medium which includes computer readable program code, which when executed by a computer processor enables the computer processor to perform a method. The method includes generating a backup on backup storage system, locking the backup for a retention span, generating a backup archive log image using archive log files for the backup, and locking the backup archive log image for a second retention span.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for generating immutable database backups with configurable retention spans. Specifically, one or more embodiments of the invention enables the ability to configure retention spans for files during database backup operations. Moreover, the retention span may be configured for each individual file in a backup operation based on the file type and/or the database to which the file is associated. The retention span may specify a period of time during which the file may not be manipulated or deleted from a backup storage.

Figure 1A:
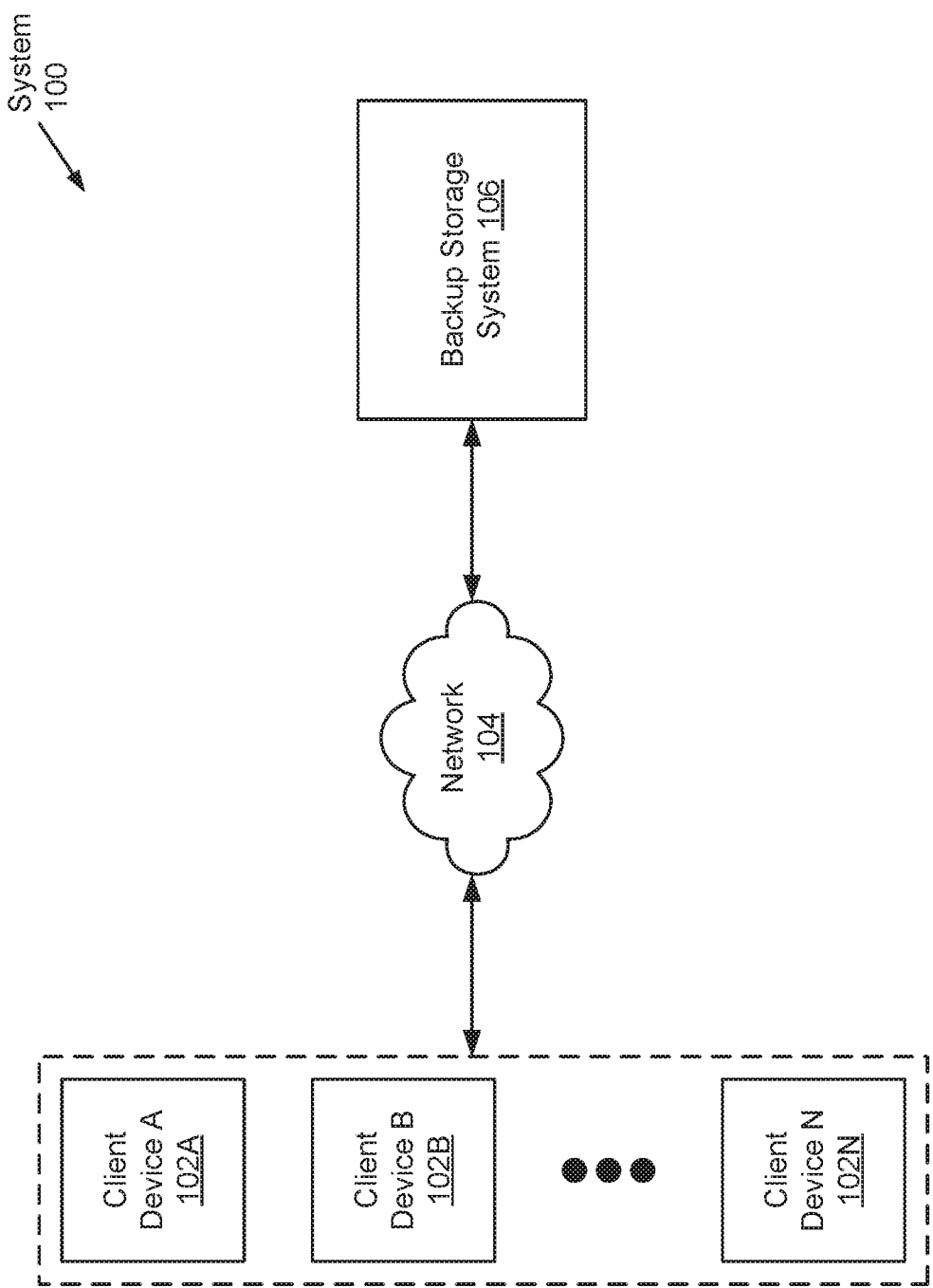
FIG. 1A shows a system in accordance with one or more embodiments of the invention.

FIG. 1A shows a system in accordance with one or more embodiments of the invention. The system (100) may include one or more client devices (102A-102N) operatively connected to a backup storage system (106). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 3. Moreover, client devices (102A-102N) are described in further detail below with respect to FIG. 1B.

In one embodiment of the invention, the backup storage system (106) may represent a data backup, archiving, and/or disaster recovery storage system. The backup storage system (106) may be implemented using one or more servers (not shown). Each server may refer to a physical server, which may reside in a datacenter, or a virtual server, which may reside in a cloud computing environment. Additionally or alternatively, the backup storage system (106) may be implemented using one or more computing systems similar to the exemplary computing system shown in FIG. 3. Furthermore, the backup storage system (106) is described in further detail below with respect to FIG. 1C.

While FIG. 1A shows a configuration of components, other system (100) configurations may be used without departing from the scope of the invention.

Figure 1B:
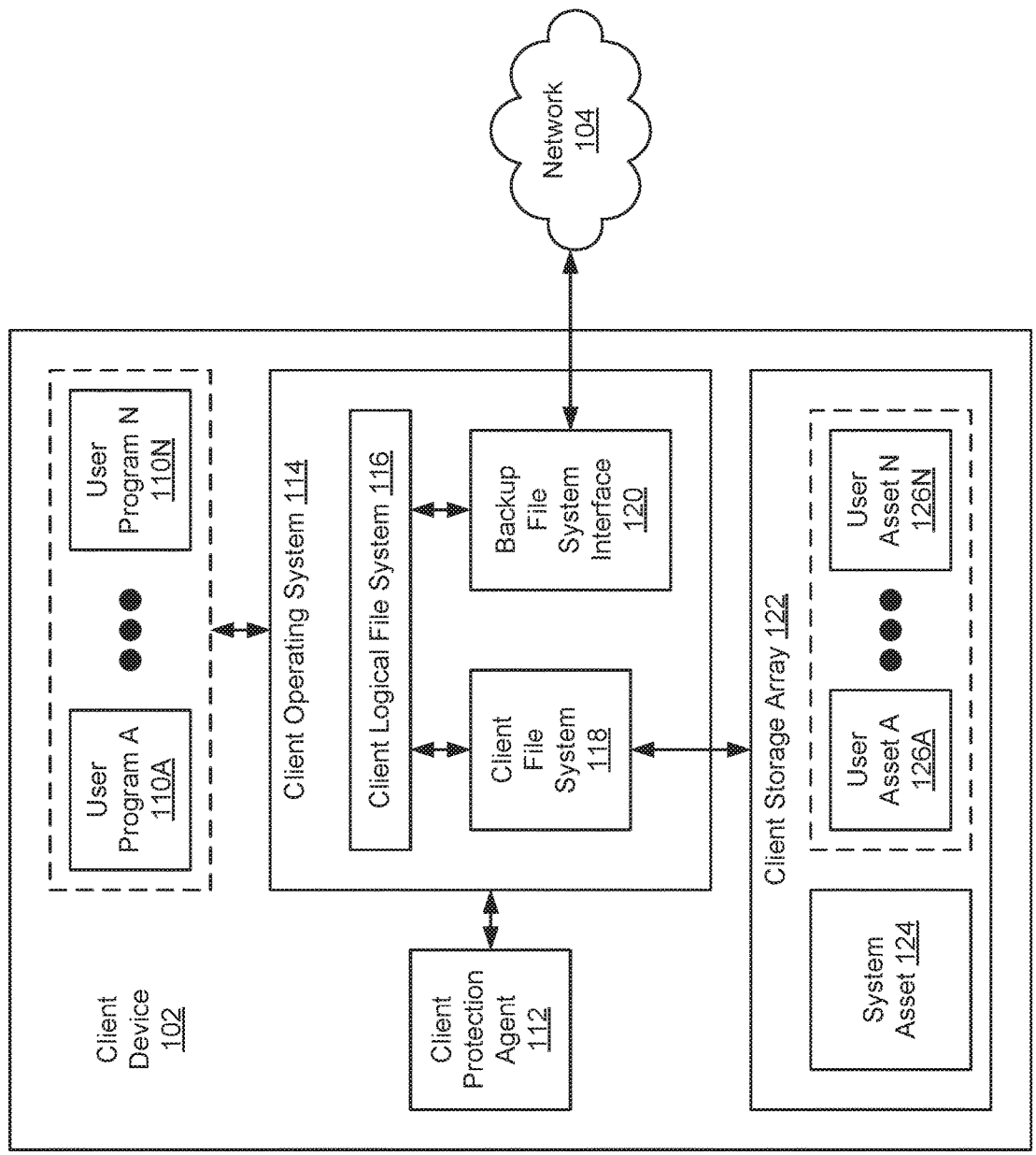
FIG. 1B shows a client device in accordance with one or more embodiments of the invention.

FIG. 1B shows a client device in accordance with one or more embodiments of the invention. The client device (102) may include one or more user programs (110A-110N), a client protection agent (112), a client operating system (114), and a client storage array (122). Each of these client device (102) components is described below.

In one embodiment of the invention, a user program (110A-110N) may refer to a computer program that may execute on the underlying hardware of the client device (102). Specifically, a user program (110A-110N) may be designed and configured to perform one or more functions, tasks, and/or activities instantiated by a user of the client device (102). Accordingly, towards performing these operations, a user program (110A-110N) may include functionality to request and consume client device (102) resources (e.g., computer processors, memory, storage (122), virtualization, network bandwidth, etc.) by way of service calls to the client operating system (114). One of ordinary skill will appreciate that a user program (110A-110N) may perform other functionalities without departing from the scope of the invention. Examples of a user program (110A-110N) may include, but are not limited to, a word processor, an email client, a database client, a web browser, a media player, a file viewer, an image editor, a simulator, a computer game, or any other computer executable application.

In one embodiment of the invention, the client protection agent (112) may refer to a computer program that may execute on the underlying hardware of the client device (102). Specifically, the client protection agent (112) may be designed and configured to perform client-side database backup and recovery operations. To that extent, the client protection agent (112) may protect one or more databases (also referred herein as system assets (124) and/or user assets (126A-126N)) on the client device (102) against data loss (i.e., backup the database(s)); and reconstruct one or more databases on the client device (102) following such data loss (i.e., recover the database(s)). One of ordinary skill will appreciate that the client protection agent (112) may perform other functionalities without departing from the scope of the invention.

In one embodiment of the invention, the client operating system (114) may refer to a computer program that may execute on the underlying hardware of the client device (102). Specifically, the client operating system (114) may be designed and configured to oversee client device (102) operations. To that extent, the client operating system (114) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (114) may perform other functionalities without departing from the scope of the invention.

For example, the client operating system (114) may facilitate user program (110A-110N) interaction with user asset (126A-126N) data stored locally on the client device (102) or remotely over the network (104). In facilitating the aforementioned interaction, the client operating system (114) may implement a client logical file system (116). The client logical file system (116) may represent a collection of in-memory data structures maintained, by the client operating system (114), to manage the various accessible user asset (126A-126N) data stored locally on the client device (102) and/or remotely on the backup storage system (106). Further, the client logical file system (116) may expose an application programming interface (API) through which the user program(s) (110A-110N) may manipulate—i.e., via one or more file operations—any granularity of locally and/or remotely stored user asset (126A-126N) data. These file operations, requested by the user program(s) (110A-110N), may subsequently be delivered to the client file system (118) or backup file system interface (120) for processing.

In one embodiment of the invention, the client file system (118) may represent a physical file system (also referred to as a file system implementation). A physical file system may refer to a collection of subroutines concerned with the physical operation of one or more physical storage devices (described below). The client file system (118), in this respect, may be concerned with the physical operation of the client storage array (122). Accordingly, the client file system (118) may employ client storage array (122) device drivers (or firmware) (not shown) to process requested file operations from the user program(s) (110A-110N). Device drivers enable the client file system (118) to manipulate physical storage or disk blocks as appropriate.

In one embodiment of the invention, the backup file system interface (120) may represent a computer program that may execute on the underlying hardware of the client device (102). Specifically, the backup file system interface (120) may be designed and configured to facilitate the access and manipulation of remotely stored database data as if the aforementioned database data were stored locally on the client device (102). Accordingly, the backup file system interface (120) may, in part, implement a distributed file system (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device (102)) across the network (104). Furthermore, the backup file system interface (120) may include functionality to issue remote procedure calls (RPCs) directed to accessing and manipulating any granularity of database data remotely stored on the backup storage system (106). The invention is not limited to the aforementioned protocols.

In one embodiment of the invention, the client storage array (122) may refer to a collection of one or more physical storage devices (not shown) on which various forms of digital data—e.g., a system asset (124) and one or more user assets (126A-126N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (122) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a system asset (124) may represent a database, or a logical container to and from which related digital data, or any granularity thereof, may be stored and retrieved, respectively. A system asset (124) may occupy a portion of a physical storage device or, alternatively, may span across multiple physical storage devices, of the client storage array (122). Furthermore, a system asset (124) may refer to a composite of various database objects including, but not limited to, one or more recovery catalogs (not shown, discussed below).

In one embodiment of the invention, a recovery catalog may refer to a database object that stores backup operation metadata. The recovery catalog may include entries for one or more backup operations. The recovery catalog entries may include metadata that includes information regarding successfully backed-up data files for a backup operation. The metadata may include data file identifiers, user asset identifiers, data file storage locations, and/or other types of metadata without departing from the scope of the invention.

In one embodiment of the invention, an user asset (126A-126N) may represent a database, or a logical container to and from which related digital data, or any granularity thereof, may be stored and retrieved, respectively. An user asset (126A-126N) may occupy a portion of a physical storage device or, alternatively, may span across multiple physical storage devices, of the client storage array (122). Furthermore, an user asset (126A-126N) may refer to a composite of various database objects including, but not limited to, one or more data files, one or more control files, one or more control files, one or more archive log files. Each of these user asset (126A-126N) subcomponents is described below.

In one embodiment of the invention, a data file may refer to a database object that stores database data. Database data may encompass computer readable content (e.g., images, text, video, audio, machine code, any other form of computer readable content, or a combination thereof), which may be generated, interpreted, and/or processed by any given user program (110A-110N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information found throughout the undeduplicated computer readable content and, accordingly, may instead reflect a content recipe of the undeduplicated computer readable content. A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object that stores user asset (126A-126N) metadata (also referred to as database metadata). Database metadata may encompass information descriptive of the database (or user asset (126A-126N)) status and structure. By way of examples, database metadata may include, but are not limited to, a database name assigned to the user asset (126A-126N), the name(s) and storage location(s) of one or more data files and redo log files associated with the user asset (126A-126N), a creation timestamp encoding the date and/or time marking the creation of the user asset (126A-126N), a log sequence number associated with a current archive log file, etc.

In one embodiment of the invention, an archive log file may refer to a database object that stores the history of changes made to the database data. An archive log file may include one or more redo entries (or redo records), which may include a set of change vectors. Each change vector subsequently describes or represents a modification made to a single user asset (126A-126N) data block. Furthermore, an archive log file may serve to recover the user asset (126A-126N) should a failover occur, or to apply recent changes to a recovered user asset (126A-126N) which may have transpired during the database recovery process.

While FIG. 1B shows a configuration of components, other client device (102) configurations may be used without departing from the scope of the invention.

Figure 1C:
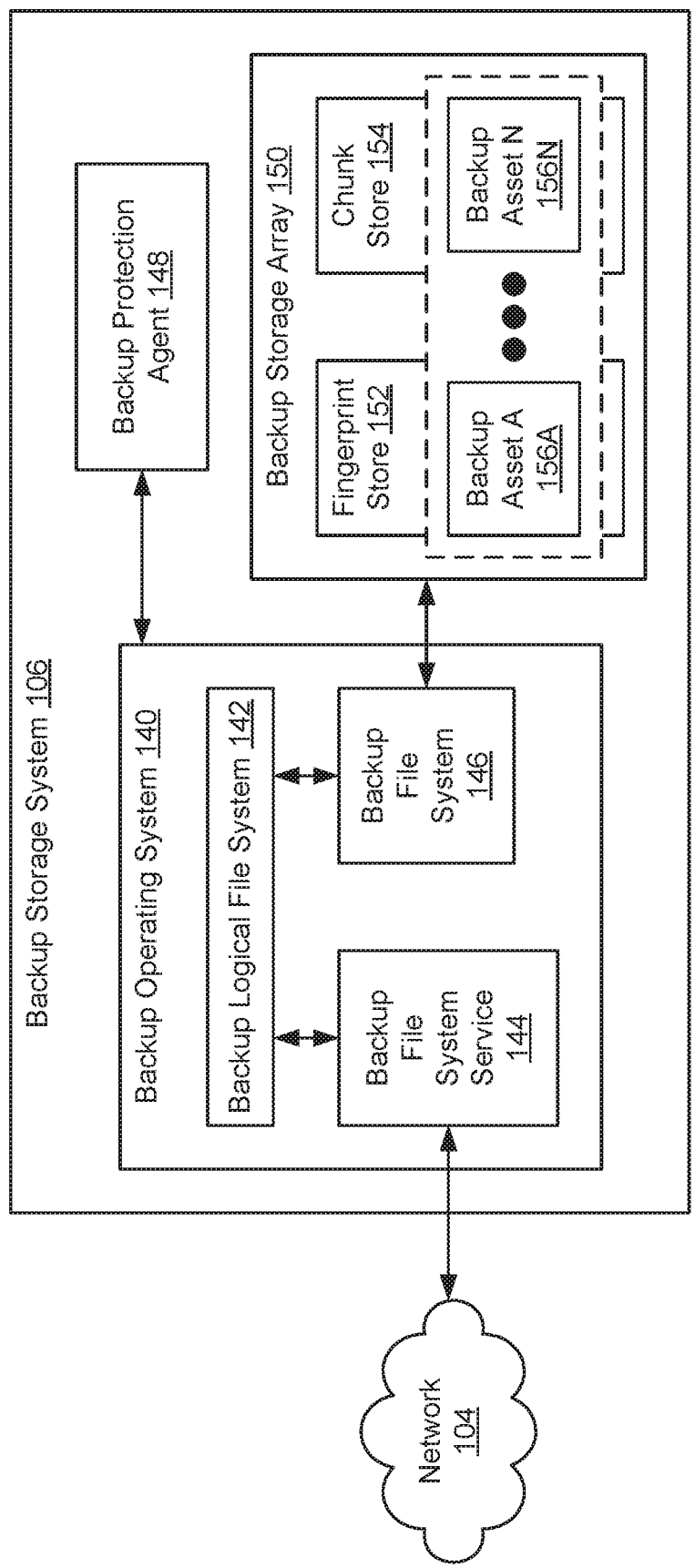
FIG. 1C shows a backup storage system in accordance with one or more embodiments of the invention.

FIG. 1C shows a backup storage system in accordance with one or more embodiments of the invention. The backup storage system (106) may include a backup operating system (140), a backup protection agent (148), and a backup storage array (150). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (156A-156N) access and manipulation by one or more computer programs (e.g., backup protection agent (148)) executing locally on the backup storage system (106) or, alternatively, by one or more remote computing systems (e.g., client device(s) (102A-102N)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (156A-156N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (156A-156N) data. File operations, requested by the local computer programs, may be delivered to the backup file system (146) for processing, whereas file operations, requested by the remote computing systems, may be received and processed by the backup file system service (144). Furthermore, the backup logical file system (142) is described in further detail below with respect to FIG. 1D.

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a DFS (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device(s) (102A-102N)) across the network (104). Furthermore, the backup file system service (144) may include functionality to service remote procedure calls (RPCs) directed to accessing and manipulating any granularity of backup database data locally stored on the backup storage system (106). The invention is not limited to the aforementioned protocols.

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (150). Accordingly, the backup file system (146) may employ backup storage array (150) device drivers (or firmware) (not shown) to process requested file operations from the local computer programs or the remote computing systems (via the backup file system service (144)). Device drivers enable the backup file system (146) to manipulate physical storage or disk blocks as appropriate.

In one embodiment of the invention, the backup protection agent (148) may refer to a computer program that may execute on the underlying hardware of the backup storage system (106). Specifically, the backup protection agent (148) may be designed and configured to perform server-side database backup and recovery operations. To that extent, the backup protection agent (148) may receive database data, submitted by the client device(s) (102A-102N), to store as backup assets (156A-156N) on the backup storage array (150) during database backup operations; and, conversely, may retrieve backup database data from the backup storage array (150) during database recovery operations. One of ordinary skill will appreciate that the backup protection agent (148) may perform other functionalities without departing from the scope of the invention.

In one embodiment of the invention, the backup storage array (150) may refer to a collection of one or more physical storage devices (not shown) on which various forms of digital data—e.g., one or more backup assets (156A-156N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (150) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (150) may include a fingerprint store (152) and a chunk store (154), which may collectively include deduplicated database data. Recall from above (see e.g., FIG. 1B), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (154) and the fingerprint store (152), respectively.

In one embodiment of the invention, the fingerprint store (152) may represent a repository for maintaining chunk identifiers. Each chunk identifier may be indexed by way of a fingerprint store (152) entry (not shown), which may store a mapping relating the chunk identifier to a storage identifier. A chunk identifier (also referred to as a fingerprint or hash)

may represent a digital signature that uniquely identifies an associated database data chunk. Further, a chunk identifier may be produced by submitting the associated database data chunk through a hash function, which may employ any existing cryptographic mapping algorithm. As such, a chunk identifier may be outputted by the hash function given the associated database data chunk as input. Meanwhile, a storage identifier may represent a character or bit string that uniquely identifies a storage location in the backup storage array (150). By way of an example, a storage identifier may encompass a tuple reflecting (a) a storage device identifier uniquely assigned to a given physical storage device (not shown) of the backup storage array (150); and (b) a binary address assigned to a starting byte (or storage block) in the given physical storage device at which the database data chunk may be physically stored.

On the other hand, in one embodiment of the invention, the chunk store (154) may represent a repository for maintaining unique database data chunks. Each unique database data chunk may be indexed by way of a chunk store (154) entry (not shown), which may store a mapping relating a storage identifier (described above) to the unique database data chunk. A database data chunk may refer to a fragment or a partition of deduplicated database data. More specifically, a database data chunk may capture a unique byte pattern that may occur or recur throughout the undeduplicated database data.

In one embodiment of the invention, a backup asset (156A-156N) may refer to a deduplicated backup copy of a given user asset (126A-126N) (see e.g., FIG. 1B). For example, a backup asset (156A-156N) may represent a database, or a logical container to and from which related digital data, or any granularity thereof, may be stored and retrieved, respectively. A backup asset (156A-156N) may occupy a portion of a physical storage device or, alternatively, may span across multiple physical storage devices, of the backup storage array (150). Furthermore, a backup asset (156A-156N) may include a combination of various database objects including, but not limited to, one or more data files, one or more control files, one or more archive log files, (all described above), and one or more tag files (described below).

In one embodiment of the invention, a tag file may refer to a database object that stores status parameters and identification information regarding backup operations. The tag file may be an archive tag file (located in an archive log directory, e.g., see FIG. 1D) or a control tag file (located in a control file directory, e.g., see FIG. 1D). The tag file may at least include a checkpoint-time parameter. The checkpoint-time parameter may specify a completion timestamp which may encode the time in which a file in the directory was generated on the client device. The tag file may include other and/or additional information without departing from the invention.

While FIG. 1C shows a configuration of components, other backup storage system (106) configurations may be used without departing from the scope of the invention.

Figure 1D:
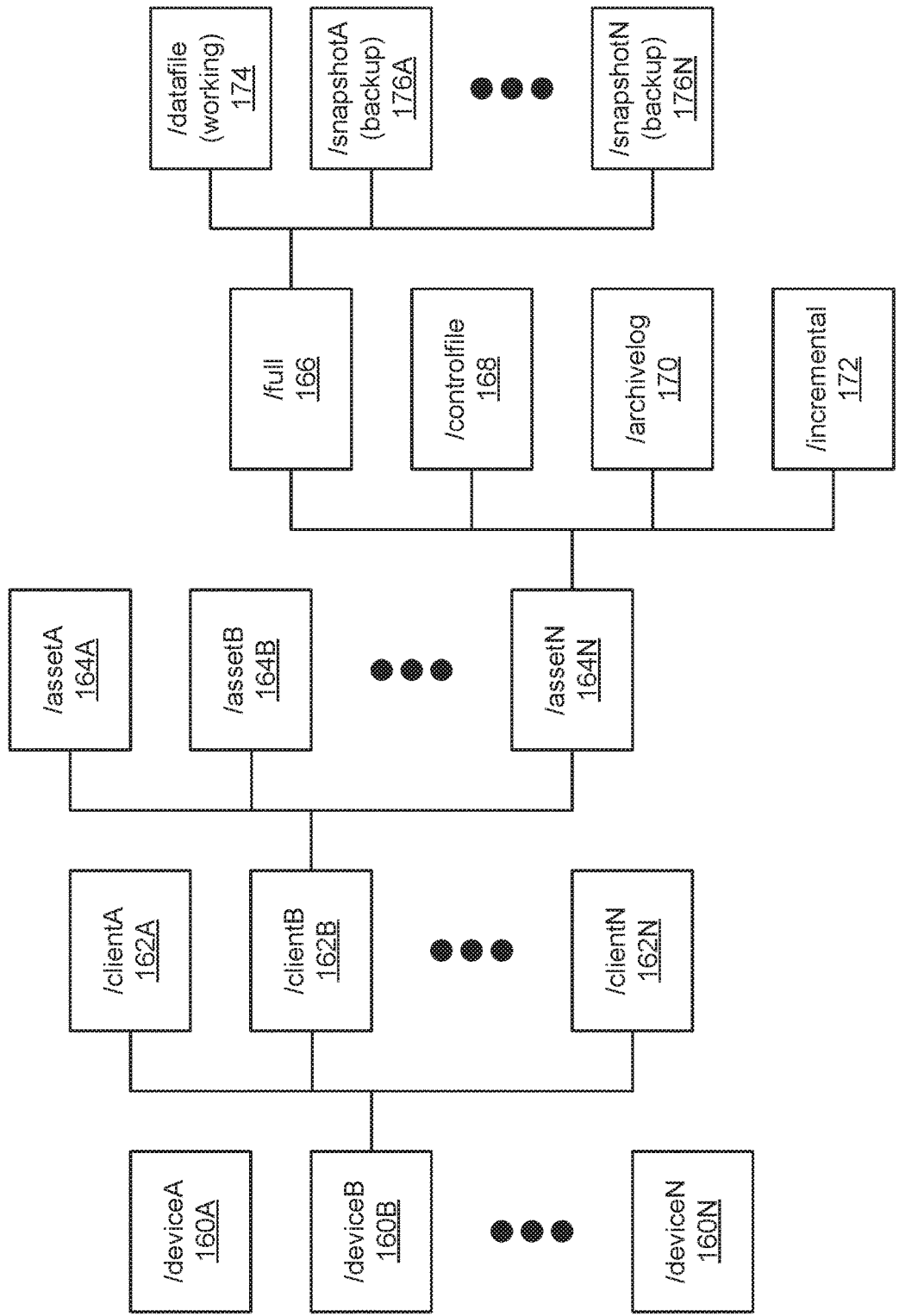
FIG. 1D shows a backup logical file system in accordance with one or more embodiments of the invention.

FIG. 1D shows a backup logical file system in accordance with one or more embodiments of the invention. A backup logical file system (142) may include one or more directories. In one embodiment of invention, a directory may be a file system cataloguing structure which includes references to other data files and/or other directories. Files may be organized by storing related files in the same directory. The backup logical file system (142) may include one or more directory hierarchies. In other words, there may be one or more directories that include subdirectories, (i.e., directories inside directories).

The backup logical file system (142) may include one or more storage device directories (i.e., /deviceA-/deviceN (160A-160N)). Each storage device directory (160A-160N) may include one or more client device directories (i.e., /clientA-/clientN (162A-162N)). Each client device directory (162A-162N) may include one or more asset directories (i.e., /assetA-/assetN (164A-164N)). Each asset directory (164A-164N) may include a full backup directory (i.e., /full (166)), a control file directory (i.e., /controlfile (168)), an archive log directory (i.e., /archivelog (170)), and an incremental backup directory (i.e., /incremental (172)). The full backup directory (166) may include a data file directory, or working directory, (i.e., /datafile (174)), and one or more snapshot, or backup, directories (i.e., /snapshotA-/snapshot (176A-176N)). Each directory and subdirectory is discussed below.

In one embodiment of the invention, a device directory (160A-160N) may refer to a directory that includes all of the backup data stored on a storage device of the backup storage system (106). As discussed above, the backup storage system (106) may include one or more servers or computing devices. A device directory (160A-160N) may include all of the backup data stored on a server or computing device including backup data from one or more client devices (102A-102N) and one or more user assets (126A-126N).

In one embodiment of the invention, a client directory (162A-162N) may refer to a directory that includes all of the backup data stored on a storage device of the backup storage system (106) that is associated with a particular client device (102A-102N). As discussed above, there may be one or more client devices (102A-102N) that store backup data into the backup storage system. The backup data stored in a client directory may be associated with one or more user assets (126A-126N) on the client device associated with the client directory (162A-162N).

In one embodiment of the invention, an asset directory (164A-164N) may refer to a directory that includes all backup data associated with a particular user asset (126A-126N). As discussed above, there may be one or more user assets (126A-126N) from which backup data is stored in the backup storage system (106).

In one embodiment of the invention, a full backup directory (166) may refer to a directory that includes all data associated with full image backups. A full backup directory my include a data file directory (174) (also referred to as a working directory) and one or more snapshot directories (176A-176N) (also referred to as backup directories). A full backup directory (166) may include one or more tag files, one or more full backup data file images of user asset (126A-126N) data files, one or more clones of full backup data file images of user asset (126A-126N), one or more control file image backups, and one or more parameter file image backups (all not shown).

In one or more embodiments of the invention, a control file directory may refer to a directory that includes all of the control files associated with an user asset (126A-126N). A control file directory may include any number of backup control file images associated with an user asset (126A-126N) that are also associated with particular point in time.

In one embodiment of the invention, an archive log directory (170) may refer to a directory that includes all backup archive log file images associated with an user asset (126A-126N). An archive log file directory may include any number of backup archive log file images associated with an user asset (126A-126N) that are also associated with particular point in time.

In one embodiment of the invention, an incremental backup directory (172) may refer to a directory that includes unmerged incremental data file images associated with an user asset (126A-126N). Incremental data file images may be stored in the incremental backup directory before being merged with existing full data file images to generate new full data file images in the data file (working) directory.

In one embodiment of the invention, a data file (working) directory (174) may refer to a directory in which all full backup data file images from the client device are written into and cloned from during backup operations.

In one embodiment of the invention, a snapshot (backup) directory (176A-176N) may refer to a directory in which clones of full backup data file images, control file images, and/or parameter file images are stored. Each snapshot directory (176A-176N) may be used to restore an associated user asset (126A-126N) to a point in time associated with the backup data file images (i.e., backup full data file images, backup control file images, backup archive log images, etc.).

While FIG. 1D shows a configuration of components, other backup logical file system (142) configurations may be used without departing from the scope of the invention.

FIGS. 2A-2D show flowcharts describing a method for generating immutable database backups with configurable retention spans in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Figure 2A:
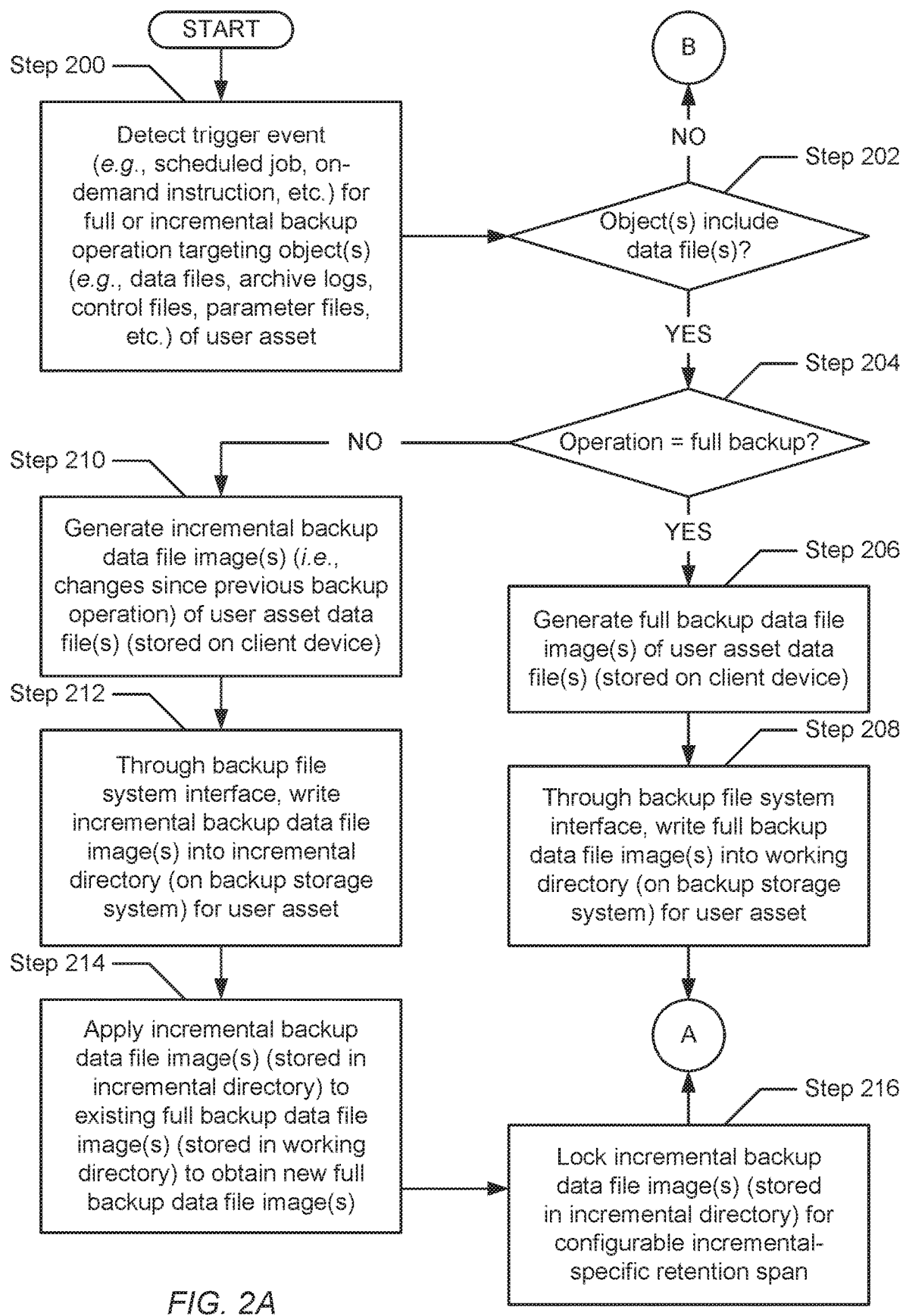
FIGS. 2A-2D show flowcharts describing a method for generating immutable database backups with configurable retention spans in accordance with one or more embodiments of the invention.

Turning to FIG. 2A, in Step 200, a trigger event for a full or incremental backup operation targeting object(s) of a user asset on a client device is detected. In one embodiment of the invention, the trigger event may be a scheduled job, an on-demand instruction, or any other event that triggers an incremental backup operation. A scheduled job may be a job that is a part of a backup operation schedule created and maintained by a database administrator. A backup operation schedule may lay out specific points in time a backup operation is to be performed. For example, a backup operation schedule may specify an incremental backup operation be performed twice a day at midnight and noon. An on-demand instruction may specify an instruction to perform an unscheduled backup operation. In another embodiment of the invention, the targeted user asset object(s) may include data files, archive log files, and control files.

In Step 202, a determination is made as to whether the object(s) includes a data file(s). Accordingly, in one embodiment of the invention, if it is determined that the object(s) includes a data file(s), then the method proceed to Step 204. On the other hand, if it is alternatively determined that the object(s) does not include a data file(s), then the method proceeds to Step 226 of FIG. 2B.

In Step 204, a determination is made as to whether the backup operation is a full backup operation. Accordingly, in one embodiment of the invention, if it is determined that the backup operation is a full backup operation, then the method proceed to Step 206. On the other hand, if it is alternatively determined that the backup operation is not a full backup operation, then the method proceeds to Step 210.

In Step 206, in response to the determinations that the targeted object(s) includes one or more data files and that the backup operation is a full backup operation, a full backup data file image(s) of the user asset data file(s) stored on the client device is generated. The full backup data file image(s) may reflect all database data of the for the given data files stored on the client device. Further, the full backup data file image(s) may be in deduplicated form and, thus, may include a full backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the full backup content recipe may convey a sequence of fingerprints collectively representative of the undeduplicated full backup content.

In Step 208, the full backup data file image(s) is written into a working directory for the user asset on the backup storage system through the backup files system interface. In one or more embodiments of the invention, the full backup data file image(s) may be written into the working directory serially or in parallel. Writing full backup data file image(s) serially may include writing full backup data file images, if there are more than one, one by one. For example, the first full backup data file image is written into the working directory. After the first full backup data file image is successfully written into the working directory, then the second full backup data file image is written into the working directory and so on until all of the full backup data file images are successfully written into the working directory. Writing full backup data file images in parallel may include writing all of the full backup data file images into the working directory at the same time.

In Step 210, an incremental backup data file image(s) of the user asset data file(s) stored on the client device is generated. In one or more embodiments of the invention, the incremental backup data file image(s) may include the changes to the data file(s) since the last incremental or full backup operation. The user asset data file(s) may be stored locally on the client device. Further, the incremental backup data file image(s) may be generated in deduplicated form and, thus, may include an incremental backup content recipe. A content recipe may refer to a sequence of chunk identifiers (or pointers) associated with (or directed to) unique database data chunks indexed in physical storage—e.g., the chunk store of the backup storage array (see e.g., FIG. 1C). In turn, a given chunk identifier for a given database data chunk may encompass a cryptographic fingerprint or hash of the given database data chunk. Accordingly, in one embodiment of the invention, the incremental backup content recipe may convey a sequence of fingerprints collectively representative of the undeduplicated incremental backup content.

In Step 212, the incremental backup date file image(s) is written into the incremental directory for the user asset on the backup storage system through the backup file system interface. In one or more embodiments of the invention, the incremental backup data file image(s) may be written into the incremental directory serially or in parallel. Writing incremental backup data file image(s) serially may include writing incremental backup data file images, if there are more than one, one by one. For example, the first incremental backup data file image is written into the incremental directory. After the first incremental backup data file image is successfully written into the incremental directory, then the second incremental backup data file image is written into the incremental director and so on until all of the incremental backup data file images are successfully written into the incremental directory. Writing incremental backup data file images in parallel may include writing all of the incremental backup data file images into the incremental directory at the same time.

In Step 214, the incremental backup data file image(s) stored in the incremental directory is applied to an existing full backup data file image(s) stored in the working directory to obtain a new full backup data file image(s). In one embodiment of the invention, the aforementioned application of incremental backup data file image(s) to existing full backup data file image(s) may entail applying any database data changes, recorded in the incremental backup data file image(s), onto the full backup data file image(s), thereby creating a new full backup data file image(s). Further, the new full backup data file image(s) may be retained in deduplicated form, similar to the full backup data file image(s) or the incremental backup data file image(s). Accordingly, the new full backup data file image may include a new full backup content recipe representative of the new full backup content.

In Step 216, the incremental backup data file image(s) is locked in the incremental directory for a configurable incremental-specific retention span. In one embodiment of the invention, locking the incremental backup data file images(s) may entail preventing the manipulation and/or deletion of the incremental backup data file image(s) from the incremental directory by users of the system. Incremental backup data file images that are retention locked may not be deleted or modified in any way for the specified retention span. The retention span may include a specific amount of time the incremental backup data file image(s) may not be modified or deleted. The retention span may be configurable on an object-by-object basis and/or an user asset by user asset basis. More specifically, the user of the system may determine a specific retention span for data file images (incremental and/or full) and a specific retention span for objects associated with a certain user asset. The incremental backup data file image(s) may be modified or deleted after the retention span ends. A user of the system may select the retention span configurations during the initiation of the backup operation.

Figure 2B:
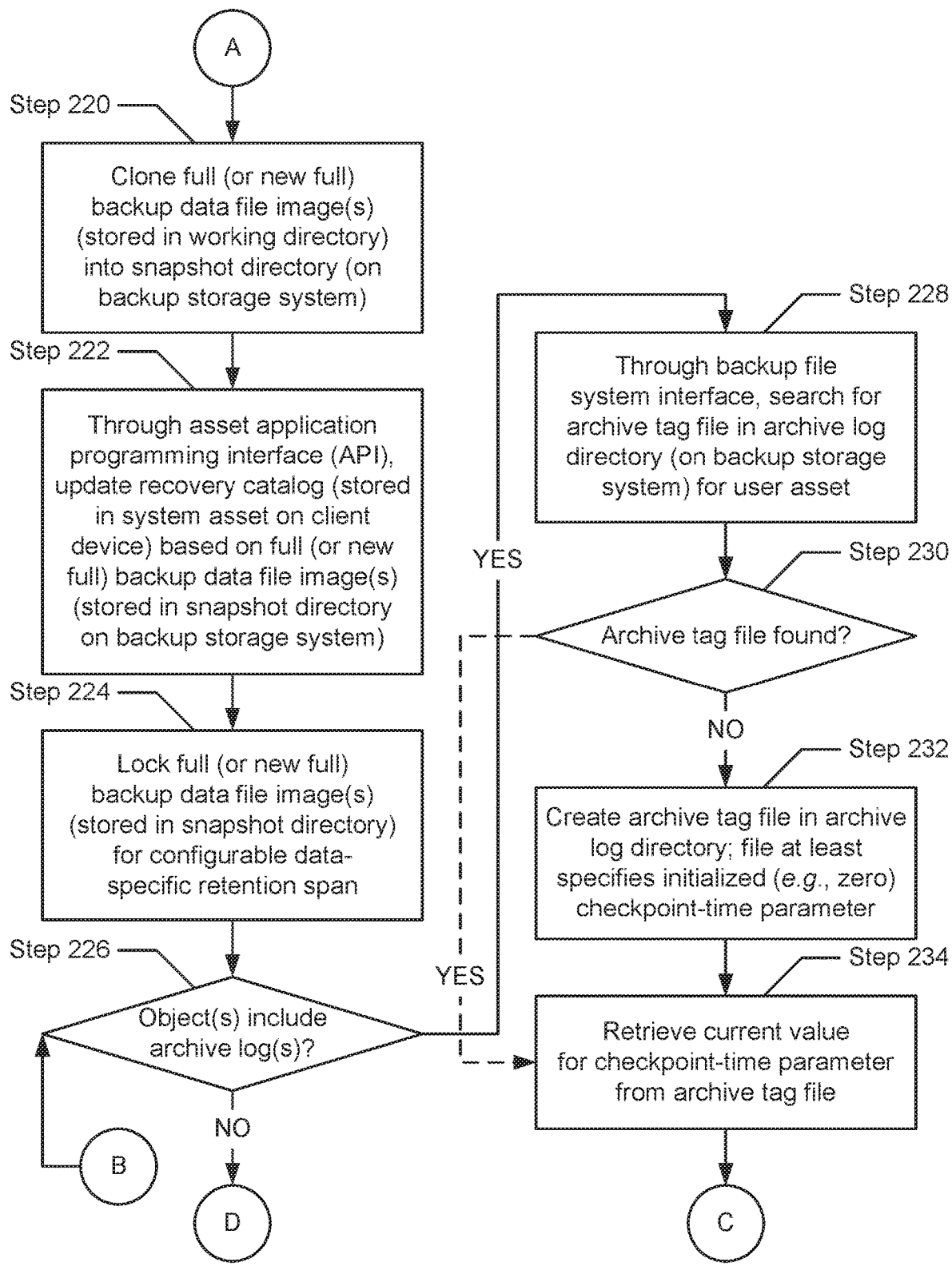

Turning to FIG. 2B, in Step 220, the full (or new full) backup data file image(s) stored in the working directory is cloned into the snapshot directory on the backup storage system. In one embodiment of the invention, the aforementioned application of incremental backup data file image(s) to existing full backup data file image(s) may entail applying any database data changes, recorded in the incremental backup data file image(s), onto the full backup data file image(s), thereby creating a new full backup data file image(s). Further, the new full backup data file image(s) may be retained in deduplicated form, similar to the full backup data file image(s) or the incremental backup data file image(s). Accordingly, the new full backup data file image may include a new full backup content recipe representative of the new full backup content.

In Step 222, a recovery catalog stored in a system asset on the client device is updated based on the full (or new full) backup data file image(s) stored in the snapshot directory on the backup storage system through the asset application programming interface (API). The asset API may enable the client device and/or entities on the client device to access and modify data files on the system asset of the client device as discussed above. Furthermore, the recovery catalog may include metadata regarding backup operations and associated data file images stored in the backup storage system as discussed above.

In one embodiment of the invention, updating the recovery catalog may entail informing the client device of the existence of the full (or new full) backup data file image(s) generated and stored in the backup storage system during the incremental or full backup operation. In one embodiment of the invention, the recovery catalog may be updated to include metadata regarding the incremental or full backup operation and the full (or new full) backup data file image(s) included therein. The metadata included in the recovery catalog may be, for example, timestamps encoding dates and/or times during which the full (or new full) backup data file image(s) had been stored into the snapshot directory and/or synthesized in the working directory; backup identifiers or names associated with the full (or new full) backup data file image(s); a directory path in the backup file system at which the full (or new full) backup data file image(s) may be found, etc.

In Step 224, the full (or new full) backup data file image(s) stored in the snapshot directory is locked for a configurable data-specific retention span. In one embodiment of the invention, locking the full (or new full) backup data file image(s) may entail preventing the manipulation and/or deletion of the full (or new full) backup data file images(s) from the snapshot directory by users of the system. The full (or new full) backup data file images that are retention locked may not be deleted or modified in any way for the specified retention span. The retention span may include a specific amount of time the full backup data file image(s) may not be modified or deleted. A user of the system may select the retention span configurations during the initiation of the backup operation. In one embodiment of the invention, Step 224 is performed following Step 216, then the retention lock for the new full backup data file image(s) may correspond to the retention time of the prior generated incremental backup data file image(s). In this scenario, the retention locks for the full backup data file image(s) and the corresponding incremental backup data file image(s) may be the same.

In Step 226, a determination is made as to whether the object(s) include an archive log file(s). Accordingly, in one embodiment of the invention, if it is determined that the object(s) include an archive log file(s), then the method proceed to Step 228. On the other hand, if it is alternatively determined that the object(s) does not include an archive log file(s), then the method proceeds to Step 252 of FIG. 2C.

In Step 228, in response to the determination that the target object(s) of the backup operation includes one or more archive log files, an archive tag file is searched for in an archive log directory for the user asset on the backup storage system through the backup file system interface. In one embodiment of the invention, the archive tag file includes metadata regarding the archive log file image(s) in the archive log directory. The archive tag file may at least specify a checkpoint-time parameter value as discussed above.

In Step 230, a determination is made as to whether the archive tag file is found. Accordingly, in one embodiment of the invention, if it is determined that the archive tag file is found, then the method proceeds to Step 234. On the other hand, if it is alternatively determined that the archive tag file is not found, then the method proceeds to Step 232.

In Step 232, in response to the determination that the archive tag file was not found in the archive log directory, the archive tag file is created in the archive log directory. In one or more embodiments of the invention, the archive tag file may at least specify an initialized checkpoint-time parameter. The checkpoint-time parameter may be initialized to zero. The archive tag file may include other and/or additional metadata pertaining to the archive log directory and the data within without departing from the scope of the invention.

In Step 234, the current value for the checkpoint-time parameter is retrieved from the archive tag file. As discussed above, the checkpoint-time parameter may specify a completion timestamp, which may encode the time at which the latest archive log was generated in the user asset of the client device. The checkpoint-time parameter may be used to identify archive log files to include in the backup operation.

Figure 2C:
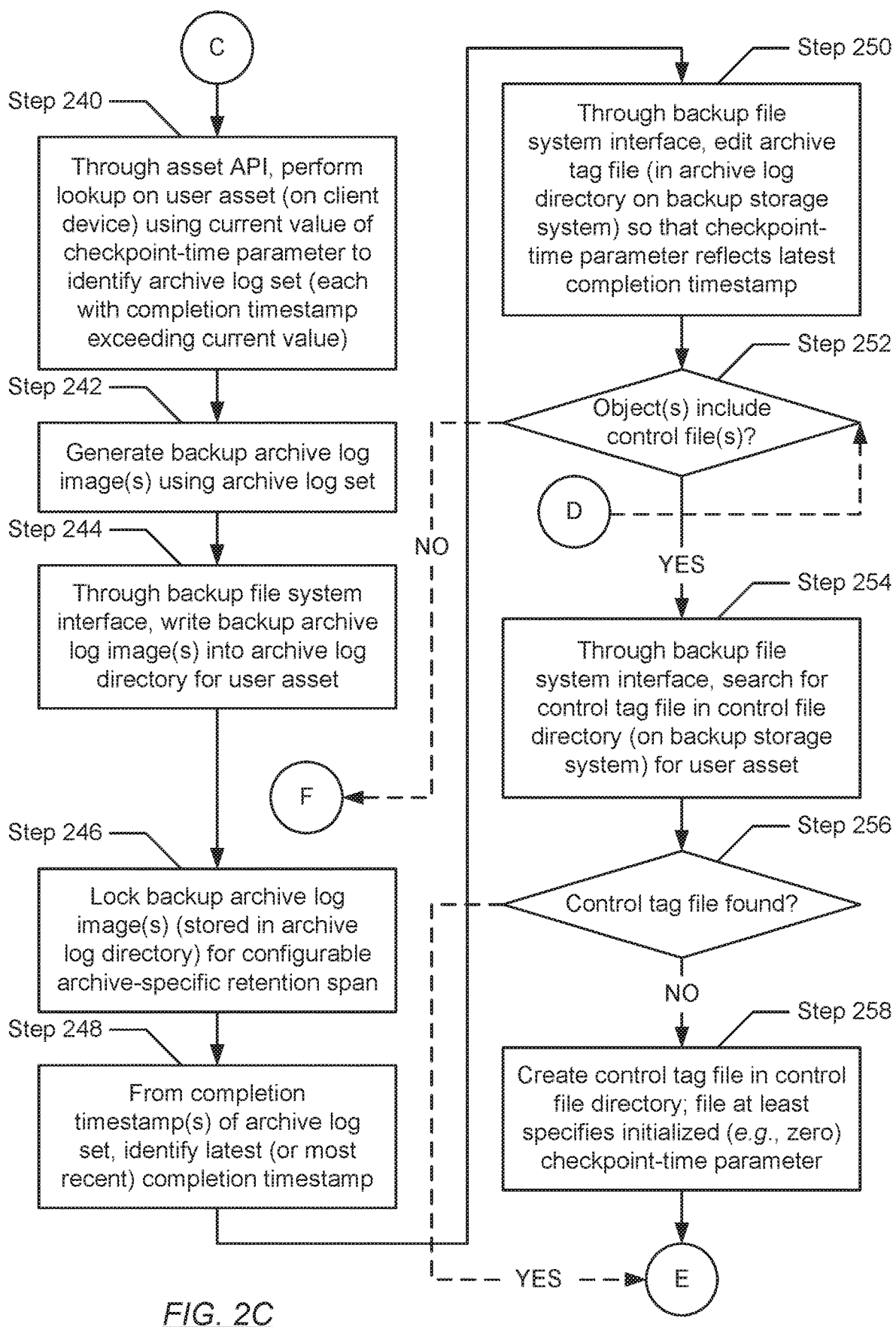

Turning to FIG. 2C, in Step 240, a lookup is performed on the user asset on the client device using current value of the checkpoint-time parameter to identify archive log set. The archive log set specifies archive log files on the user asset on the client device with a completion time greater than that which is indicated from the checkpoint-time parameter. The archive log files in the archive log set may correspond to archive log files that may not have been included in a previous backup operation and, thus, may be unprotected. In one embodiment of the invention, each archive log file in the archive log set may have a completion timestamp exceeding the current value of the checkpoint-time parameter on the tag file in the archive log directory.

In Step 242, a backup archive log image(s) is generated of the archive log files specified in the archive log set. The backup archive log image(s) may be stored locally (in deduplicated or undeduplicated form) on the client device.

In Step 244, the backup archive log image(s) is written into the archive log directory for the user asset through the backup file system interface. In one or more embodiments of the invention, the backup archive log image(s) may be written into the archive log directory serially or in parallel. Writing backup archive log image(s) serially may include writing backup archive log images, if there are more than one, one by one. For example, the first backup archive log image is written into the archive log directory. After the first backup archive log image is successfully written into the archive log directory, then the second backup archive log image is written into the archive log directory and so on until all of the backup archive log images are successfully written into the archive log directory. Writing backup archive log images in parallel may include writing all of the backup archive log images into the archive log directory at the same time.

In Step 246, the backup archive log image(s) stored in the archive log directory is locked for a configurable archive-specific retention span. In one embodiment of the invention, locking the backup archive log image(s) may entail preventing the manipulation and/or deletion of the backup archive log images(s) from the archive log directory by users of the system. Backup archive log images that are retention locked may not be deleted or modified in any way for the duration of the specified retention span. The retention span may include a specific amount of time the backup archive log image(s) may not be modified or deleted. The retention span may be configurable on an object by object basis and an user asset by user asset basis. More specifically, the user of the system may determine a specific retention span for backup archive log images (as opposed to data file images and control file images) and/or a specific retention span for objects associated with a certain user asset. The backup archive log image(s) may be modified or deleted after the retention span ends. A user of the system may select the retention span configurations during the initiation of the backup operation.

In Step 248, the latest, or most recent, completion timestamp is identified from the completion timestamp(s) of the archive log files specified in the archive log set. The completion timestamps of the archive log files may be compared to identify the most recent completion time associated with an archive log file of the archive log set. More specifically, the completion time of the archive log file of the archive log set that was generated most recently on the client device may be identified as a result of the comparison.

In Step 250, the archive tag file stored in the archive log directory on the backup storage system is edited through the backup file system interface so that the checkpoint-time parameter reflects the completion timestamp of the latest generated archive log file included in the backup operation. As a result, the next backup operation of the user asset that includes archive logs may only include archive logs in the archive log set with a completion time exceeding the completion time reflected (identified in Step 248) in the updated archive tag file. In other words, the archive log set in the next backup operation of the user asset may not include archive log files that were included in the previous backup operations.

In Step 252, a determination is made as to whether the object(s) include a control file(s). Accordingly, in one embodiment of the invention, if it is determined that the object(s) include a control file(s), then the method proceed to Step 254. On the other hand, if it is alternatively determined that the object(s) does not include a control file(s), then the method may end following Step 252.

In Step 254, in response to the determination that one or more control files are included in the objects, a control tag file is searched for through the backup file system interface in a control file directory for the user asset on the backup storage system. In one or more embodiments of the invention, the control tag file may at least specify a checkpoint-time parameter. The checkpoint-time parameter may specify a completion timestamp, which may encode the latest time in which a control file stored in the control file directory was generated for the user asset on the client device. The control tag file may include other metadata pertaining to the control file directory and the data within without departing from the scope of the invention.

In Step 256, a determination is made as to whether the control tag file is found. Accordingly, in one embodiment of the invention, if it is determined that the control tag file is found, then the method proceeds to Step 260 of FIG. 2D. On the other hand, if it is alternatively determined that the control tag file is not found, then the method proceeds to Step 258.

In Step 258, in response to the determination that the control tag file was not found in the control file directory, a control tag file is created in the control file directory. In one or more embodiments of the invention, the control tag file may specify at least an initialized checkpoint-time parameter. The checkpoint-time parameter may be initialized to zero. The control tag file may include other and/or addition metadata pertaining to the control file directory and the data within without departing from the scope of the invention.

Figure 2D:
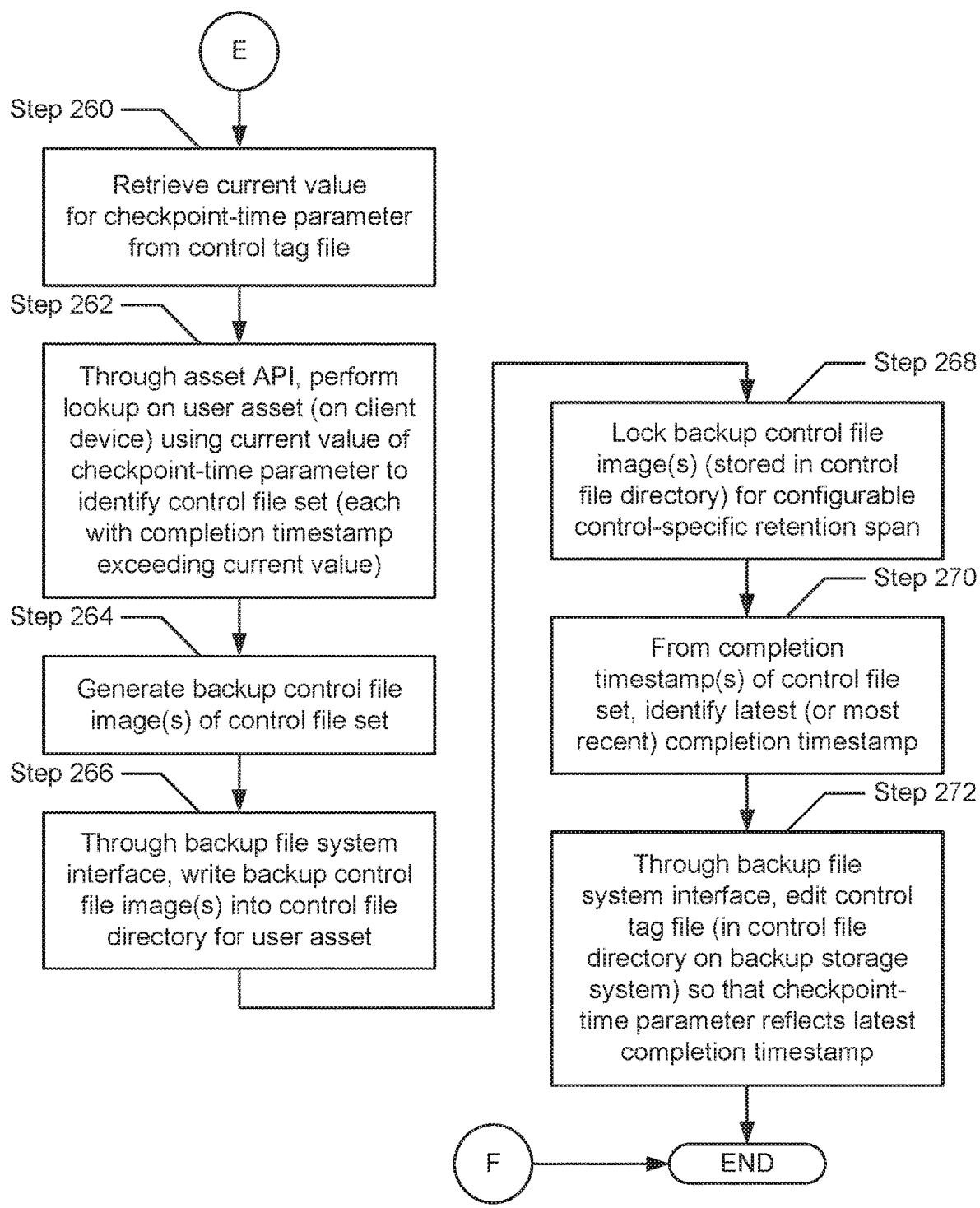

Turning to FIG. 2D, in Step 260, the current value for the checkpoint-time parameter is retrieved from the control tag file. As discussed above, the checkpoint-time parameter may include the completion time of the most recently created control file in the user asset on the client device. The checkpoint-time parameter may be used to identify control files to include in the backup operation.

In Step 262, a lookup is performed on the user asset on the client device using the current value of the checkpoint-time parameter through the asset API to identify a control file set. Control file(s) on the user asset on the client device with a completion time greater than that which is indicated from the checkpoint-time parameter in the control file directory in the backup storage may not have been included in a previous backup operation and may be unprotected. In one embodiment of the invention, the control file(s) included in the control file set may have completion timestamps that exceed the current value of the checkpoint-time parameter.

In Step 264, the backup control file image(s) of the control file set is generated. In one embodiment of the invention, the backup control file image(s) may include metadata associated with the user asset on the client device. The control file(s) of the control file set may be stored locally on the client device. Further, the backup control file image(s) may be generated in deduplicated form and, thus, may include a backup control file image content recipe.

In Step 266, the backup control file image(s) is written into the control file directory for the user asset through the backup file system interface. In one or more embodiments of the invention, the backup control file image(s) may be written into the control file directory serially or in parallel. Writing backup control file image(s) serially may include writing backup control file images, if there are more than one, one by one. For example, the first backup control file image is written into the control file directory. After the first backup control file image is successfully written into the control file directory, then the second backup control file image is written into the control file directory and so on until all of the backup control file images are successfully written into the control file directory. Writing backup control file images in parallel may include writing all of the backup control file images into the control file directory at the same time.

In Step 268, the backup control file image(s) stored in the control file directory is locked for a configurable control-specific retention span. In one embodiment of the invention, locking the backup control file image(s) may entail preventing the manipulation and/or deletion of the backup control file images(s) from the control file directory by users of the system. Backup control file images that are retention locked may not be deleted or modified in any way for the duration of the specified retention span. The retention span may include a specific amount of time the backup control file image(s) may not be modified or deleted. The retention span may be configurable on an object by object basis and an user asset by user asset basis. More specifically, the user of the system may determine a specific retention span for backup control file images (as opposed to backup data file images and backup archive log file images) and/or a specific retention span for objects associated with a certain user asset. The backup control file image(s) may be modified or deleted after the retention span ends. A user of the system may select the retention span configurations during the initiation of the backup operation.

In Step 270, the latest (or most recent) completion timestamp from the completion timestamp(s) of the control file set is identified. The completion timestamps of the control files of the control file set on the client device may be compared to identify the most recent completion time associated with an control file of the control file set. More specifically, the completion time of the control file of the control file set that was generated most recently on the client device may be identified as a result of the comparison.

In Step 272, the control tag file in the control file directory is edited through the backup file system interface so that the checkpoint-time parameter reflects the latest completion timestamp. As a result, the next backup operation of the user asset that includes control files may only include control files in the control file set with a completion time exceeding the completion time reflected (identified in Step 270) in the updated control tag file. In other words, the control file set in the next backup operation of the user asset may not include control files that were included in the previous backup operations.

The method may end following Step 272.

Figure 3:
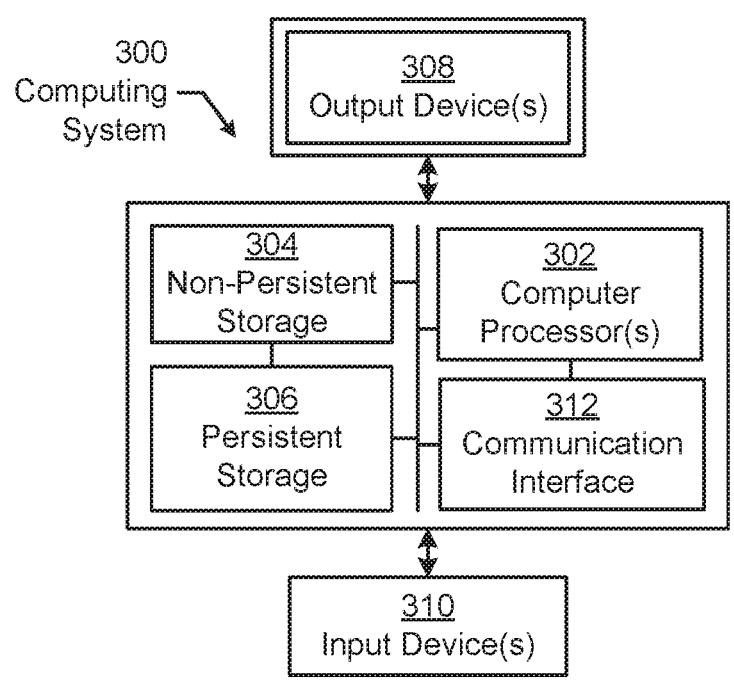
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, comprising:
 generating a backup on a backup storage system;
 locking the backup for a retention span;
 generating a backup archive log image using archive log files for the backup;
 locking the backup archive log image for a second retention span, wherein the second retention span is selected independently of the retention span;
 generating a second backup on the backup storage system, wherein the second backup is an incremental backup associated with the backup; and
 locking the second backup for a third retention span, wherein the retention span and the third retention span are equal.

2. The method of claim 1, wherein the backup is a full backup.

3. The method of claim 1, wherein the backup cannot be manipulated during the retention span.

4. The method of claim 1, wherein generating the backup archive log image comprises:
 obtaining a checkpoint-time parameter; and
 generating an archive log set using the checkpoint-time parameter, wherein the archive log set specifies the archive log files.

5. The method of claim 4,
 wherein the checkpoint-time parameter is obtained from an archive tag file;
 wherein the method further comprises:
 updating the archive tag file with a second checkpoint-time parameter after locking the backup and the backup archive log image.

6. A system, comprising:
 a processor;
 a client protection agent, which when executed by the processor performs a method, the method comprising:
 generating a backup on a backup storage system;
 locking the backup for a retention span;
 generating a backup archive log image using archive log files for the backup;
 generating a second backup on the backup storage system, wherein the second backup is an incremental backup associated with the backup;
 locking the backup archive log image for a second retention span, wherein the second retention span is selected independently of the retention span; and
 locking the second backup for a third retention span, wherein the retention span and the third retention span are equal.

7. The system of claim 6, wherein the backup is a full backup.

8. The system of claim 6, wherein the backup cannot be manipulated during the retention span.

9. The system of claim 6, wherein generating the backup archive log image comprises:
 obtaining a checkpoint-time parameter; and
 generating an archive log set using the checkpoint-time parameter, wherein the archive log set specifies the archive log files.

10. The system of claim 9, wherein generating the backup archive log image further comprises:
 wherein the checkpoint-time parameter is obtained from an archive tag file;
 wherein the method further comprises:
 updating the archive tag file with a second checkpoint-time parameter after locking the backup and the backup archive log image.

11. A non-transitory computer readable medium comprising computer readable program code, which when executed by a computer processor enables the computer processor to perform a method, the method comprising:
 generating a backup on a backup storage system;
 locking the backup for a retention span;
 generating a backup archive log image using archive log files for the backup;
 locking the backup archive log image for a second retention span, wherein the second retention span is selected independently of the retention span;
 generating a second backup on the backup storage system, wherein the second backup is an incremental backup associated with the backup; and
 locking the second backup for a third retention span, wherein the retention span and the third retention span are equal.

12. The non-transitory computer readable medium of claim 11, wherein the backup is a full backup.

13. The non-transitory computer readable medium of claim 11, wherein the backup cannot be manipulated during the retention span.

14. The non-transitory computer readable medium of claim 11, wherein generating the backup archive log image comprises:
 obtaining a checkpoint-time parameter; and
 generating an archive log set using the checkpoint-time parameter, wherein the archive log set specifies the archive log files.

* * * * *